(12) United States Patent
Picha

(10) Patent No.: US 7,283,545 B2
(45) Date of Patent: Oct. 16, 2007

(54) STRUCTURED TERMINATION IDENTIFICATION FOR EPHEMERAL TERMINATIONS

(75) Inventor: Marianne Picha, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 983 days.

(21) Appl. No.: 10/445,609

(22) Filed: May 27, 2003

(65) Prior Publication Data

US 2004/0240456 A1 Dec. 2, 2004

(51) Int. Cl.
*H04L 12/28* (2006.01)
*H04L 12/56* (2006.01)

(52) U.S. Cl. ............... 370/401; 370/352; 370/389; 370/254; 370/400; 370/431; 370/432; 370/338; 370/392

(58) Field of Classification Search ............ 370/401, 370/389, 352, 400, 254, 431, 432, 338, 392
See application file for complete search history.

(56) References Cited

U.S. PATENT DOCUMENTS 6,338,130 B1 * 1/2002 Sinibaldi et al. ............ 712/35
6,490,451 B1 * 12/2002 Denman et al. ............ 455/436
6,952,433 B1 * 10/2005 Stumpert et al. ............ 370/524
2005/0038949 A1 * 2/2005 Patterson et al. ............ 710/315

OTHER PUBLICATIONS

International Telecommunications Union, H.248.1—Gateway Control Protocol: Version 1, Mar. 2002.*

* cited by examiner

*Primary Examiner*—Doris H. To
*Assistant Examiner*—Andrew Chriss

(57) ABSTRACT

A method for identifying ephemeral terminations in a packet-based network includes identifying the Radio Network Controller with an RNC indicator in a first level, identifying the one or more ICCs with an ICC indicator in a second level, identifying the one or more PMCs with a PMC indicator in a third level, and identifying the one or more local components with a local component indicator in a fourth level. The first level, second level, third level and fourth level form different portions of the termination identifier. The termination identifier is structured so that the one or more local components identified in the fourth level are associated with the one or more PMCs identified in the third level, and the one or more PMCs identified in the third level are associated with the one or more ICCs identified in the second level and the one or more ICCs identified in the second level are associated with the one or more RNCs identified in the first level.

16 Claims, 2 Drawing Sheets

STRUCTURED TERMINATION IDENTIFICATION FOR EPHEMERAL TERMINATIONS

The present invention relates to a method for identifying terminations in a communications network, and more particularly to a method of identifying packet-based ephemeral terminations.

Communications networks use Media Gateways (MGs) to enable voice and data traffic to traverse through the network. Media Gateways, together with the Signaling Gateways and the Media Gateway Controller, also known as a softswitch, comprise the distributed IP telephony network components that provide functionality analogous to the switching equipment within the PSTN. Media Gateways act as translation units to enable communication between disparate networks. Mobile access Media Gateways enable wireless terminals to connect to packet based wireless networks. A media gateway can also connect the public switched telephone network (PSTN) to asynchronous transfer mode (ATM) networks, the PSTN to IP networks, ATM networks to Internet protocol (IP) networks, or even IP networks to IP networks when different protocols or coders are being used.

International Telecommunications Union (ITU) standard H.248 provides a protocol whereby a Media Gateway Controller can control a Media Gateway. Within the scope of the H.248 protocol each media connection made to the Media Gateway is identified using a termination identifier, also referred to as a termination ID. There are two types of terminations IDs, physical and ephemeral. Physical termination IDs correspond to media connections made to fixed hardware interfaces, such as for example, a Time Division Multiplex (TDM) interface to the PSTN. Physical termination IDs exist for as long as the physical hardware is provisioned in the Media Gateway. Ephemeral termination IDs correspond to media connections made to dynamic hardware interfaces, such as for example, a Real Time Protocol (RTP) packet stream interfacing to an IP network. Ephemeral termination IDs exist for only the lifetime of the media connection.

Currently, when a packet interface within a Media Gateway recovers, and the result is the loss of one or more media connections, each affected connection is reported individually in a separate message. The Termination ID appearing within the message identifies the media connection that was lost. Sometimes, portions of an interface fail which affects many terminations. Communicating information about each termination individually can require many messages to complete the recovery of the interface. Similarly, when there is a recovery of a component in the mobile radio network, separate messages are sent from the Media Gateway Controller to the Media Gateway to recover each affected media connection. It is desirable to provide an improved termination ID structure that can reduce the number of messages required to recover a failed interface or component.

SUMMARY OF THE INVENTION

A method for associating, through the use of a structured termination identifier, one or more packet based network ephemeral terminations to one or more local components in a Media Gateway is provided. The invention is also applicable to associating one or more packet based network ephemeral terminations to one or more radio network components.

In accordance with a first aspect of the invention, the method includes identifying the Radio Network Controller with an RNC indicator in a first level, identifying the one or more ICCs with an ICC indicator in a second level, identifying the one or more PMCs with a PMC indicator in a third level, and identifying the one or more local components with a local component indicator in a fourth level. The first level, second level, third level and fourth level form different portions of the termination identifier.

In accordance with a second aspect of the invention, the termination identifier is structured so that the one or more local components identified in the fourth level are associated with the one or more PMCs identified in the third level, and the one or more PMCs identified in the third level are associated with the one or more ICCs identified in the second level and the one or more ICCs identified in the second level are associated with the one or more RNCs identified in the first level.

In accordance with another aspect of the invention, the method also includes using a wildcard character as at least one of the indicators.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention may take form in certain components and structures, preferred embodiments of which will be illustrated in the accompanying drawings wherein.

DETAILED DESCRIPTION OF THE INVENTION

Figure 1:
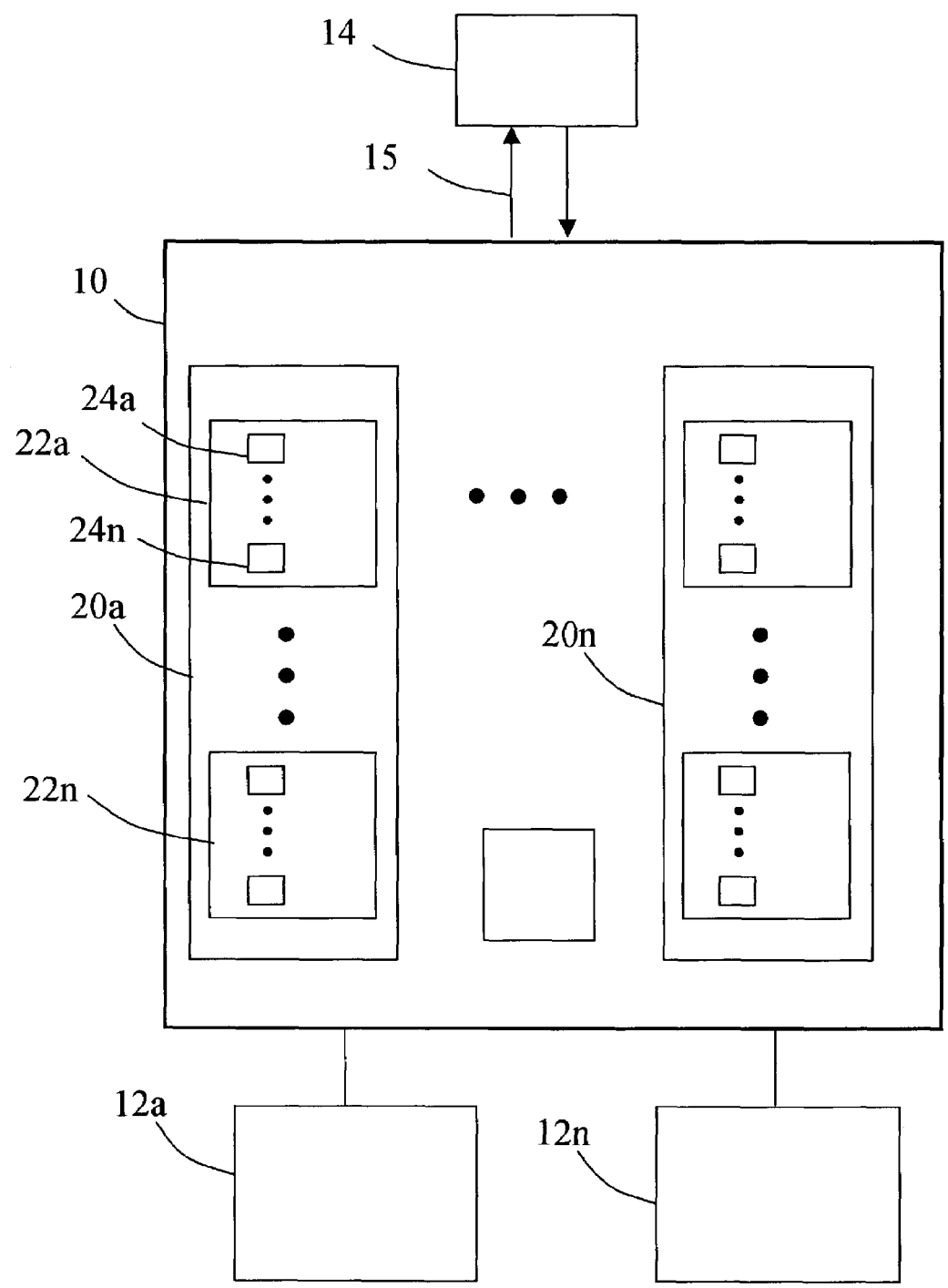
FIG. 1 illustrates a Media Gateway in accordance with the invention.

Referring now to FIG. 1 a Media Gateway is shown generally at 10. The Media Gateway 10 is connected to one or more Radio Network Controllers (RNCs) shown as 12a through 12n in a radio network (not shown) such as a UMTS wireless network. The Media Gateway 10 is connected to a Media Gateway Controller 14 which controls the flow of media from the radio network to the media gateway. Media Gateway 10 communicates with the Media Gateway Controller 14 via connections 15 using H.248 protocol messages, or any other suitable messaging scheme.

The Media Gateway 10 includes a plurality of Intelligent Carrier Cards (ICC) shown as 20a through 20n. Each ICC 20a-20n includes a plurality of Peripheral Component Interconnect (PCI) Mezzanine Cards (PMCs) shown as 22a through 22n. Each PMC includes a plurality of local components, referred to collectively as 24, which form the end points for packet-based ephemeral terminations, such as for example ATM based connections, between the Media Gateway 10 and the Radio Network (12). An ephemeral termination refers to a logical entity that represents the point where the bearer path comes into, or terminates, with the local component 24 in the Media Gateway 10.

Typically, each PMC 22 in each ICC 20 contains associated local components 24. The local components 24 can be a plurality of Digital Signal Processor (DSPs) channels, shown as 24a through 24n, which are used for performing voice processing functions such as echo cancellation and compression, or any other suitable local components, forming end points for ephemeral terminations. There can be 100 DSP channels 24 on a PMC 22, four PMCs on an ICC 20 and ten ICCs in a Media Gateway, though these numbers are given as examples only and any suitable number may exist.

Figure 2:
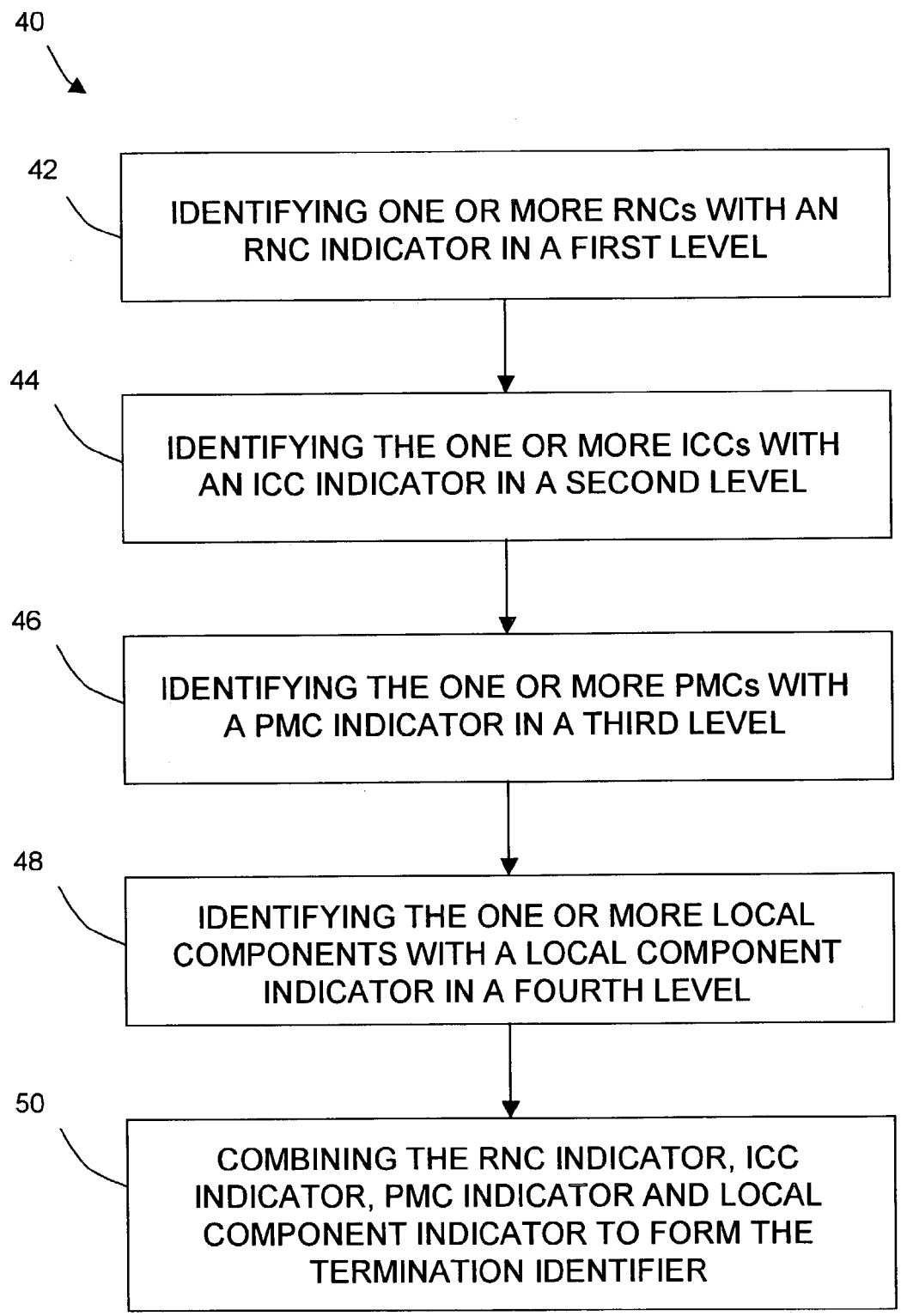
FIG. 2 illustrates the steps of identifying one or more ephemeral terminations in accordance with the invention.

Referring now to FIG. 2, a method of identifying one or more packet based network ephemeral terminations to one or more local components 24 in one or more Media Gateways 10 with a termination identifier is shown generally at 40. The method includes identifying the Radio Network Controller (RNC) 12 associated with the ephemeral termination with an RNC component indicator in a first level at 42, identifying the one or more ICCs associated with the identified RNC 12 with an ICC component indicator in a second level at 44, identifying the one or more PMCs associated with the identified ICCs with a PMC component indicator in a third level at 46, and identifying the one or more local components associated with the identified PMC with a local component indicator in a fourth level at 48.

The method can also include combining the RNC component indicator, the ICC component indicator, the PMC component indicator and the local component indicator to form the termination identifier at 50. The component indicators are appended to each other so that the first level, second level, third level and fourth levels form different portions of the termination identifier as shown below:

<RNC indicator><ICC indicator><PMC indicator><Local Component indicator>

The termination identifier is structured so that the one or more local components identified in the fourth level are associated with the one or more PMCs identified in the third level, and the one or more PMCs identified in the third level are associated with the one or more ICCs identified in the second level and the one or more ICCs identified in the second level are associated with the one or more RNCs identified in the first level.

The termination identifier is preferably a number and the RNC component indicator forms the highest order positions, the ICC component indicator forms the next highest order positions, the local component indicator forms the lowest order positions and the PMC component indicator forms the next lowest order positions. The RNC component indicator, ICC component indicator, PMC component indicator and local component indicator can be numbers large enough to individually identify all of the components associated with the connection. For example, the RNC component indicator can be 4 bits or two text characters in length, the ICC component indicator can be 4 bits or two text characters in length, the PMC component indicator can be 2 bits or one text character in length and the local component indicator can be 22 bits or seven text characters in length, although any suitably sized number can be used.

An example of the complete termination identifier identifying the channel in an ephemeral termination can be:
<prefix>/1/1/4/20

The termination identifier formed in accordance with the invention can be used in H.248 messages communicated between the Media Gateway Controller and the Media Gateway and the <prefix> can be any suitable string. For example, the H.248 message can be a request to modify the media connection that was previously established, or any other suitable H.248 message. In addition these messages can be sent during recovery of lost connections which may occur during hardware failures.

To achieve quick recovery, wildcard characters can be used as a component indicator to represent all components for that level. A "*", representing "all" is typically used for the wildcard character. When using a "*" character for the local component indicator the identified terminations include terminations to all local components identified by the rest of the termination ID. When using a "*" character for the PMC indicator, the identified terminations include terminations to all PMCs identified by the rest of the termination ID. When using a "*" character for the ICC indicator, the identified terminations include terminations to all ICCs identified by the rest of the termination ID.

Also, more than one wildcard character can be used. For example:
<prefix>/*/x/*/* can be used to represent all channels associated with ICC x. Further:
<prefix>/*/x/y/* can be used to represent all channels associated with ICC x and PMC y.

Another use of wildcard characters is the use of "wildcard choose" represented by a different character such as $. To instantiate a packet media connection from an RNC 12 to the Media Gateway 10, the Media Gateway Controller 14 instructs the Media Gateway 10 to create a new termination ID where the RNC component indicator is set to represent RNC 12a, and the remaining component indicators are set to the wildcard choose "$". An example of the ephemeral termination identifier sent to the Media Gateway identifying the RNC 12a in this manner can be:
<prefix>/z/$/$/$ where z is the RNC component indicator.

The Media Gateway will subsequently allocate the necessary hardware to process the requested media connection based on the resources available to it, finish constructing the termination ID so that it identifies the allocated hardware, and return the complete termination ID to the Media Gateway Controller.

When the identifier is set by the MGC 14 and the RNC 12a initializes, the MGC 14 can recover all of the connections associated with that RNC 12a by using the wildcarded termination:
<prefix>/z/*/*/* where z is the RNC component indicator. The remainder of the termination ID structure (ICC/PMC/Local) is set in the MG 10 and allows the Media Gateway to recover a loss of ICC or PMC. This structure reduces the number of messages required for recovering the ephemeral terminations thereby reducing the recovery time. It also allows recovery in both directions, Media Gateway Controller to Media Gateway as well as Media Gateway to Media Gateway Controller.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

I claim:

1. A method for associating one or more packet based network ephemeral terminations to one or more local components in one or more Media Gateways with a termination identifier, wherein the termination identifier identifies one or more local components and one or more Media Gateway PMC cards and one or more Media Gateway Intelligent Carrier Cards (ICCs) and one or more Radio Network Controllers, the method comprising:

identifying the one or more Radio Network Controller components with an RNC indicator in a first level;

identifying the one or more ICC components with an ICC indicator in a second level;

identifying the one or more PMC components with a PMC indicator in a third level; and identifying the one or more local components with a local component indicator in a fourth level; wherein the first level, second level, third level and fourth levels form different portions of the termination identifier and the termination identifier is structured so that the one or more local components identified in the fourth level are associated with the one or more PMCs identified in the third level, and the one or more PMCs identified in the third level are associated with the one or more ICCs identified in the second level and the one or more ICCs identified in the second level are associated with the one or more RNCs identified in the first level.

2. The method defined in claim 1 wherein the termination identifier is a number and the method further comprises:

combining the RNC indicator, the ICC indicator, the PMC indicator and the local component indicator to form the termination identifier, wherein the RNC indicator forms the highest order positions, the ICC indicator forms the next highest order positions, the local component indicator forms the lowest order positions and the PMC indicator forms the next lowest order positions.

3. The method defined in claim 1 further including using wildcard characters for a component indicator.

4. The method defined in claim 1 further including using wildcard characters for more than one component indicator.

5. The method defined in claim 2 wherein the RNC indicator is 4 bits or two text characters.

6. The method defined in claim 2 wherein the ICC indicator is 4 bits or two text characters.

7. The method defined in claim 2 wherein the PMC indicator is 2 bits or one text character.

8. The method defined in claim 2 wherein the local component indicator is 22 bits or seven text characters 9. A method for identifying a packet based network ephemeral termination to one or more local components in one or more Media Gateways with a termination identifier, wherein one or more local components are associated with one or more Media Gateway PMC cards and one or more PMC cards are associated with one or more Media Gateway Intelligent Carrier Cards (ICCs) and one or more ICCs are associated with a Radio Network Controller; the method comprising:

identifying the Radio Network Controller with an RNC indicator in a first level;

identifying the one or more ICCs with an ICC indicator in a second level;

identifying the one or more PMCs with a PMC indicator in a third level; and identifying the one or more local components with a local component indicator in a fourth level; wherein the first level, second level, third level and fourth levels form different portions of the termination identifier.

10. The method defined in claim 9 wherein the termination identifier is a number and the method further comprises:

combining the RNC indicator, the ICC indicator, the PMC indicator and the local component indicator to form the termination identifier, wherein the RNC indicator forms the highest order positions, the ICC indicator forms the next highest order positions, the local component indicator forms the lowest order positions and the PMC indicator forms the next lowest order positions.

11. The method defined in claim 9 further including using wildcard characters for a component indicator.

12. The method defined in claim 11 further including using wildcard characters for more than one component indicator.

13. The method defined in claim 10 wherein the RNC indicator is 4 bits or two text characters.

14. The method defined in claim 10 wherein the ICC indicator is 4 bits or two text characters.

15. The method defined in claim 10 wherein the PMC indicator is 2 bits or one text character.

16. The method defined in claim 10 wherein the local component indicator is 22 bits or seven text characters.

* * * * *